United States Patent [19]
Hind et al.

[11] 3,945,883
[45] Mar. 23, 1976

[54] LIQUID METAL COOLED NUCLEAR REACTORS

[75] Inventors: John Richard Hind, Warrington; John Graham Durston, Northwich, both of England

[73] Assignee: United Kingdom Atomic Energy Authority, London, England

[22] Filed: Aug. 13, 1974

[21] Appl. No.: 497,068

[30] Foreign Application Priority Data
Aug. 24, 1973 United Kingdom............ 40295/73

[52] U.S. Cl. .................... 176/40; 176/38; 176/87
[51] Int. Cl.² ........................................ G21C 9/00
[58] Field of Search .................. 176/37, 38, 40, 87

[56] References Cited
UNITED STATES PATENTS
3,378,452   4/1968   Costes.................................. 176/38
3,719,556   3/1973   Snyder, Jr. et al................... 176/40

OTHER PUBLICATIONS

Transactions of ANS, Vol. 13, No. 2, Nov. 1970, pp. 720, 721.

Primary Examiner—Harvey E. Behrend
Attorney, Agent, or Firm—Larson, Taylor and Hinds

[57] ABSTRACT

A fast reactor core is submerged in a pool of liquid metal coolant and there is a catchment tray for falling fuel debris disposed beneath the core. The catchment tray comprises a complex of open top collecting vessels arranged on lattice pitches in layers, the lattice pitches of the layers being off-set to provide a complete catchment area.

6 Claims, 2 Drawing Figures

LIQUID METAL COOLED NUCLEAR REACTORS

BACKGROUND OF THE INVENTION

This invention relates to liquid cooled nuclear reactor constructions.

One known construction of liquid cooled nuclear reactor comprises a core supported on a diagrid within a steel primary vessel. The primary vessel depends from the roof of a prestressed concrete vessel which forms the primary containment. The core is submerged in a pool of liquid sodium and comprises a plurality of fuel element sub-assemblies closely packed side-by-side on the diagrid. The fuel element sub-assemblies each comprise a bundle of closely spaced slender fuel pins of a fissile material, the bundle being enclosed by a steel wrapper or shroud through which sodium coolant is flowed upwardly in heat exchange with the fuel pins. In the event of a loss of coolant flow, such as would be caused by a blockage of some of the fuel pin interspaces, the temperature of the fuel could rise sufficiently to cause it to melt and the resultant molten fuel could have sufficient heat capacity to cause it eventually to burn through the material of the primary vessel thereby releasing liquid sodium into the primary containment. One method of reducing such risk consists in providing a catchment tray for molten fuel debris below the diagrid. One such tray which has been proposed comprises a plurality of spaced elongate troughs of "V" cross-section arranged in layers, the troughs in any layer are parallel to each other but those of alternate layers are laid in directions normal to each other. The troughs of a third layer (which are laid in the same direction as those of the uppermost first layer) are off-set to the troughs of the first layer so as to provide catchment for debris falling through the spaces between the troughs of the first layer. Similarly the troughs of a fourth layer are off-set to those of the second layer. In this way a catchment tray of multiple layers may be built up to provide a barrier impervious to debris falling from the core but sufficiently pervious to enable liquid sodium to flow upwardly by natural or forced convection effectively to cool the troughs. However, difficulties are foreseen in providing an adequate system of support for the trays and an adequate restraint against thermal distortion that is effective during the time in which they contain molten fuel. Furthermore, if the trays were manufactured from exotic high melting point materials there could be problems in effecting satisfactory end closures.

SUMMARY OF THE INVENTION

According to the invention in a liquid cooled nuclear reactor construction wherein the core is supported within a primary vessel containing a pool of liquid coolant in which the core is submerged, there is provided a catchment tray for debris falling from the core, the catchment tray comprising a complex of open top collecting vessels having central support struts, the vessels being spaced apart and arranged in layers in lattice pitch, the lattice pitch of the vessels in each layer being off-set to the lattice pitches of the vessels in the other layers so that upper vessels partially overlap lower vessels, the support struts extending through interspaces defined by the vessels in off-set pitch to a common supporting sub-structure of the complex, arranged so that the complex of vessels presents a complete catchment area to falling debris whilst being pervious to liquid coolant circulating upwardly by convection.

The invention has application to liquid metal cooled fast neutron reactor constructions.

Preferably, the collecting vessels comprise conical dishes and are arranged in triangular lattice pitch in each layer and the complex of vessels comprises three layers. Conical vessels can be economically manufactured and are not readily distorted by temperature to such an extent that the distortion would affect their capacity to retain molten debris.

Alternatively, the collecting vessels may be rectilinear and arranged on a square lattice.

The catchment tray may comprise two or more such complexes in stacked array.

DESCRIPTION OF THE DRAWINGS

The accompanying drawings illustrate diagrammatically an embodiment of the invention in a liquid metal cooled nuclear reactor construction and is described by way of example.

DESCRIPTION OF THE PREFERRED EMBODIMENTS

Figure 1:
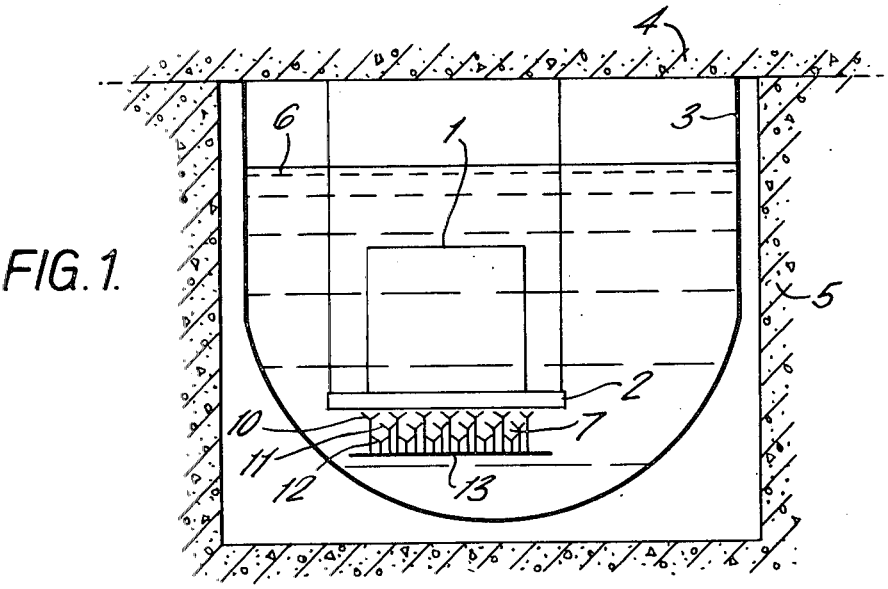
FIG. 1 is a construction of nuclear reactor.

FIG. 1 shows a core 1 supported on a diagrid 2 within a steel primary vessel 3. The primary vessel depends from the roof 4 of concrete primary containment 5. The core is submerged in a pool 6 of liquid sodium and comprises a plurality of fuel element sub-assemblies (not shown) closely packed side-by-side. Each fuel element subassembly comprises a bundle of closely spaced slender fuel pins of a fissile material sheathed in steel. The bundle is enclosed by a steel wrapper or shroud of hexagonal cross-section through which sodium is flowed upwardly from the diagrid in heat exchange with the fuel pins. A catchment tray 7 for the collection of debris falling from the core is disposed beneath the core.

Figure 2:
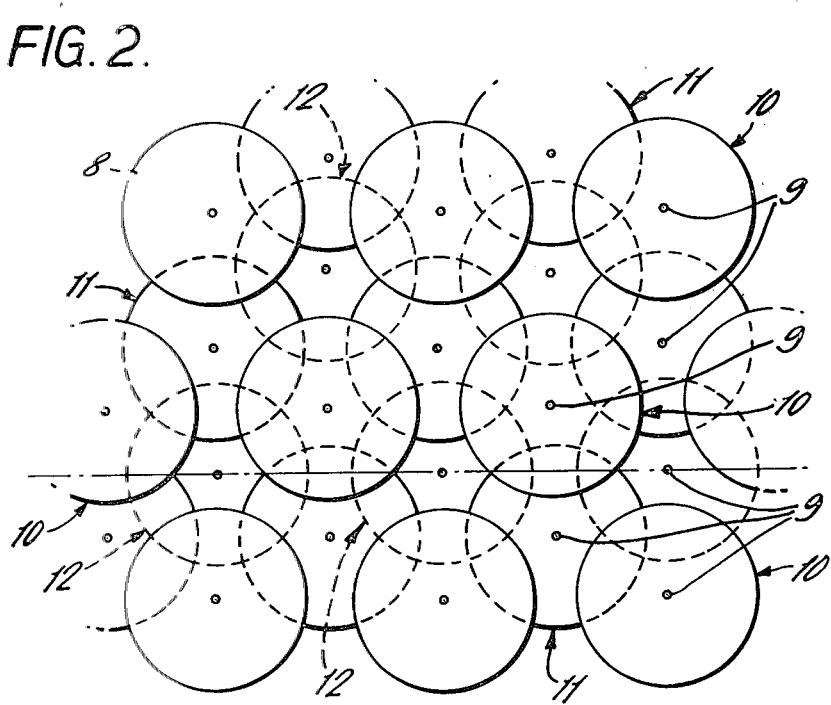
FIG. 2 is a construction of catchment tray for the nuclear reactor and is shown in plan view.

Referring now to FIG. 2, the catchment tray 7 illustrated therein comprises a complex of open top collecting vessels in the form of conical dishes 8 having central suppport struts 9. The dishes are spaced apart and arranged in three layers 10, 11, 12 in triangular lattice pitch. The lattice pitch of the dishes in each layer are offset to the lattice pitches of the vessels in the other layers so that the dishes of the upper layer 10 partially overlap dishes of the intermediate and lower layers 11, 12, and the dishes of the intermediate layer 11 overlap the dishes of the lower layer 12. The support struts 9 extend through the interspaces afforded by the dishes in off-set pitch to a common supporting substructure 13 (FIG. 1) of the complex. The entire arrangement of the dishes is such that a complete catchment area is presented to debris, such as molten fuel, falling from the core but there is sufficient separation to enable sodium to flow upwardly by natural or forced convection through the complex. In the event of upper dishes becoming over full, the overspill would normally be retained by the lower dishes. To guard against damage by overspill from the lowest dishes further containment trays 7 can be provided in stacked array.

In other arrangements of catchment trays suitable for use in nuclear reactor installations both conical dishes and rectilinear vessels could be used; the conical dishes and rectilinear vessels could be arranged in alternate layers and the holding capacity of the conical dishes could be increased by providing them with cylindrical upward extensions.

We claim:

1. A liquid cooled nuclear reactor construction comprising:
    a primary vessel containing a pool of liquid coolant,
    a nuclear reactor core submerged in the pool of liquid coolant,
    a catchment tray for collecting debris falling from the core, the catchment tray comprising a complex of open top collecting vessels having central support struts and a substructure for supporting the collecting vessels, the vessels being spaced apart and arranged in layers in lattice pitch, the lattice pitch of the vessels in each layer being off-set to the lattice pitches of the vessels in the other layers so that upper vessels partially overlap lower vessels, the support struts extending through interspaces defined by the vessels in off-set pitch to the supporting substructure, arranged so that the complex of vessels presents a complete catchment area to falling debris whilst being pervious to liquid coolant circulating upwardly by convection.

2. A liquid cooled nuclear reactor construction according to claim 1 wherein the collecting vessels comprise conical dishes and are arranged in triangular lattice pitch in each layer, the complex comprising three layers of vessels.

3. A liquid cooled nuclear reactor construction according to claim 1 wherein the collecting vessels comprise rectilinear vessels and are arranged in square lattice pitch in each layer, the complex of vessels comprising at least three layers.

4. A liquid cooled nuclear reactor construction according to claim 1 wherein the complex of collecting vessels comprises at least one layer of conical dishes and at least one layer of rectilinear vessels.

5. A liquid cooled nuclear reactor construction according to claim 1 wherein the catchment tray comprises a plurality of complexes of collecting vessels in stacked array.

6. A liquid cooled nuclear reactor construction according to claim 2 wherein the reactor is a fast neutron reactor and the coolant is liquid metal.

* * * * *